(12) United States Patent
Lee et al.

(10) Patent No.: US 8,670,340 B2
(45) Date of Patent: Mar. 11, 2014

(54) METHOD AND APPARATUS FOR UPLINK SCHEDULING IN A COMMUNICATION SYSTEM

(75) Inventors: Neung-Hyung Lee, Seongnam-si (KR); Eun-Jung Kim, Suwon-si (KR); Sung-Oh Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 13/079,199

(22) Filed: Apr. 4, 2011

(65) Prior Publication Data

US 2011/0243014 A1    Oct. 6, 2011

(30) Foreign Application Priority Data

Apr. 5, 2010   (KR) .................. 10-2010-0030903

(51) Int. Cl.
*G06F 11/00* (2006.01)
*H04J 1/16* (2006.01)
*H04L 12/26* (2006.01)

(52) U.S. Cl.
USPC ......................................... 370/252; 370/254

(58) Field of Classification Search
USPC .......... 370/241, 310–350, 252–254; 455/403, 455/422.1, 450
See application file for complete search history.

(56) References Cited

U.S. PATENT DOCUMENTS

| | | | |
|---|---|---|---|
| 8,493,925 B2* | 7/2013 | Moulsley et al. | 370/329 |
| 2010/0070814 A1* | 3/2010 | Damnjanovic et al. | 714/748 |
| 2010/0254321 A1* | 10/2010 | Kim et al. | 370/329 |
| 2010/0322086 A1* | 12/2010 | Harris et al. | 370/252 |
| 2011/0117948 A1* | 5/2011 | Ishii et al. | 455/509 |
| 2011/0128859 A1* | 6/2011 | Bucknell et al. | 370/241 |
| 2011/0143765 A1* | 6/2011 | Moulsley et al. | 455/450 |
| 2011/0151883 A1* | 6/2011 | Bossard et al. | 455/450 |

* cited by examiner

*Primary Examiner* — Chuong T Ho
(74) *Attorney, Agent, or Firm* — Jefferson IP Law, LLP

(57) ABSTRACT

A method and apparatus for uplink scheduling in a communication system are provided. The method includes determining whether a User Equipment (UE) is included in an uplink scheduling list, a buffer length of the UE is estimated, if the UE is included in the uplink scheduling list, it is determined whether a Buffer State Report (BSR) indicating the buffer length of the UE has been received from the UE, if the estimated buffer length is 0, and the UE is transitioned to a non-zero BSR reception state and maintained in the uplink scheduling list, if the BSR has not been received from the UE. The non-zero BSR reception state is a state in which a zero BSR indicating the buffer length of the UE is 0 has not been received.

18 Claims, 11 Drawing Sheets

METHOD AND APPARATUS FOR UPLINK SCHEDULING IN A COMMUNICATION SYSTEM

PRIORITY

This application claims the benefit under 35 U.S.C. §119 (a) of a Korean patent application filed in the Korean Intellectual Property Office on Apr. 5, 2010 and assigned Serial No. 10-2010-0030903, the entire disclosure of which is hereby incorporated by reference.

BACKGROUND OF THE INVENTION

1. Field of the Invention

The present invention relates to a method and apparatus for uplink scheduling in a communication system.

2. Description of the Related Art

In general, an UpLink (UL) scheduler of a Base Station (BS) is made aware of the existence of data in a buffer of a User Equipment (UE) by receiving a Buffer State Report (BSR) from the UE. If the UL scheduler fails to receive the BSR from the UE, it cannot determine the existence or absence of data in the buffer, even though the buffer of the UE has the data. As a result, the UL scheduler does not allocate resources for data transmission to the UE.

Since the BSR is also a kind of data, the BSR can be transmitted to the UL scheduler only when the UL scheduler allocates resources for transmission of the BSR. Accordingly, if the UL scheduler does not allocate resources for BSR transmission, the UE may not transmit the BSR to the UL scheduler and thus may not be allocated resources for data transmission. That is, the UE may be placed in a deadlock state. This phenomenon is called BSR stall. The reason for causing the BSR stall phenomenon is that the UE and the UL scheduler operate in the following manner.

Firstly, the UL scheduler estimates the buffer length of the UE based on a BSR received from the UE and extracts the amount of data that the UE has transmitted successfully from its buffer based on the estimated buffer length. Herein, the size of the buffer is assumed to be a buffer length.

Secondly, if the estimated buffer length of the UE is '0', the buffer of the UE is determined to be empty and the UL scheduler excludes the UE from a UL scheduling list that lists UEs to be scheduled.

Thirdly, if new data to be transmitted to the BS is generated before the buffer of the UE is empty, that is, before the estimated buffer length is '0' after the UE transmitted the previous BSR to the UL scheduler, the UE does not trigger a regular BSR.

Finally, if no BSR has been transmitted to the UL scheduler during a predetermined BSR transmission period, the UE triggers a periodic BSR. Since the UE does not trigger a Scheduling Request (SR) in this case, the UL scheduler does not know whether the UE's buffer has a BSR to be transmitted. In addition, due to no transmission of a BSR to the UL scheduler during the predetermined BSR transmission period, the UE is excluded from the UL scheduling list and thus not allocated resources for BSR transmission.

According to a standard, it is regulated that a regular BSR is triggered when a UE does not transmit a BSR until expiration of a timer set to a predetermined timer value. Although the BSR stall phenomenon may be mitigated through this operation, a BSR retransmission time to which the timer is set is at least 320 Transmission Time Intervals (TTIs) and thus data buffered in the buffer of the UE is transmitted after the time delay of 320 TTIs unless the UL scheduler performs a certain operation.

SUMMARY OF THE INVENTION

Aspects of the present invention are to address at least the above-mentioned problems and/or disadvantages and to provide at least the advantages described below. Accordingly, an aspect of the present invention provides a method and apparatus for scheduling User Equipments (UEs) according to whether a Base Station (BS) has received Buffer State Reports (BSRs) from the UEs.

Another aspect of the present invention provides a scheduling method and apparatus for classifying the states of UEs according to whether BSRs have been received from the UEs and determining whether to include the UEs in a UL scheduling list according to the classified states of the UEs, to thereby reduce a BSR stall phenomenon.

In accordance with an aspect of the present invention, a method for uplink scheduling in a communication system is provided. The method includes determining whether a UE is included in an uplink scheduling list, estimating a buffer length of the UE, if the UE is included in the uplink scheduling list, determining whether a BSR indicating the buffer length of the UE has been received from the UE, if the estimated buffer length is 0, and transitioning a state of the UE to a non-zero BSR reception state and maintaining the UE in the uplink scheduling list, if the BSR has not been received from the UE. The non-zero BSR reception state is a state in which a zero BSR indicating the buffer length of the UE is 0 has not been received from the UE.

In accordance with another aspect of the present invention, an apparatus for uplink scheduling in a communication system is provided. The apparatus includes a state transition unit which for determining whether a UE is included in an uplink scheduling list, for estimating a buffer length of the UE, if the UE is included in the uplink scheduling list, for determining whether a receiver has received a BSR indicating the buffer length of the UE from the UE, if the estimated buffer length is 0, and for transitioning a state of the UE to a non-zero BSR reception state and maintaining the UE in the uplink scheduling list, if the receiver has not received the BSR from the UE. The non-zero BSR reception state is a state in which a zero BSR indicating the buffer length of the UE is 0 has not been received from the UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
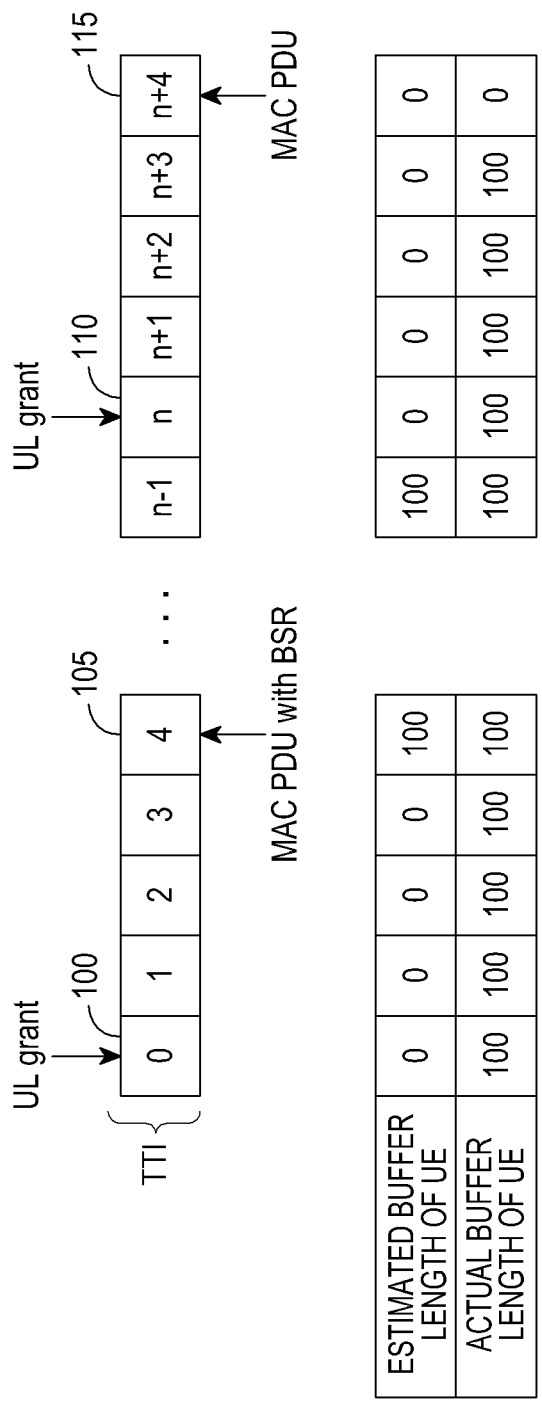
FIG. 1 illustrates a case in which a Buffer State Report (BSR) stall phenomenon does not occur according to the related art.

FIG. 1 illustrates a case in which a Buffer State Report (BSR) stall phenomenon does not occur according to the related art.

Referring to FIG. 1, it is assumed that 100 bytes of data are buffered in a buffer of a UE in a Transmission Time Interval (TTI) prior to a first TTI 100 (TTI 0), and the UE transmits a Scheduling Request (SR) to an UpLink (UL) scheduler and thus receives a first UL grant indicating resources allocated for BSR transmission from the UL scheduler in TTI 0.

In a fifth TTI 105 (TTI 4), the UE transmits a Medium Access Control (MAC) Packet Data Unit (PDU) with a BSR according to the UL grant to the UL scheduler. Upon receipt of the BSR, the UL scheduler estimates the buffer length of the UE to be 100 bytes. Thus, the actual buffer length of the UE is equal to its estimate calculated by the UL scheduler. For convenience of description, a processing delay taken to estimate the buffer length after receiving the MAC PDU at the UL scheduler is assumed to be zero TTIs.

The UL scheduler then transmits a second UL grant for allocating resources for transmission of the 100-byte data to the UE in an $(n+1)^{th}$ TTI 110 (TTI n). The UE transmits a MAC PDU to the UL scheduler in an $(n+5)^{th}$ TTI 115 (TTI (n+4)) to the UL scheduler. After transmitting the UL grant, the UL scheduler estimates the buffer length of the UE to be 0 bytes in TTI n. Because the estimated buffer length is 0 bytes, the UL scheduler does not transmit any more UL grants to the UE. In this case, it is assumed that the UL scheduler updates the estimated buffer length of the UE at the moment the second UL grant is transmitted. While the UL scheduler may update the estimated buffer length of the UE by decoding a MAC PDU on a logical channel group basis for the UE each time the MAC PDU is received, a description related to logical channel groups will not be provided herein.

Figure 2:
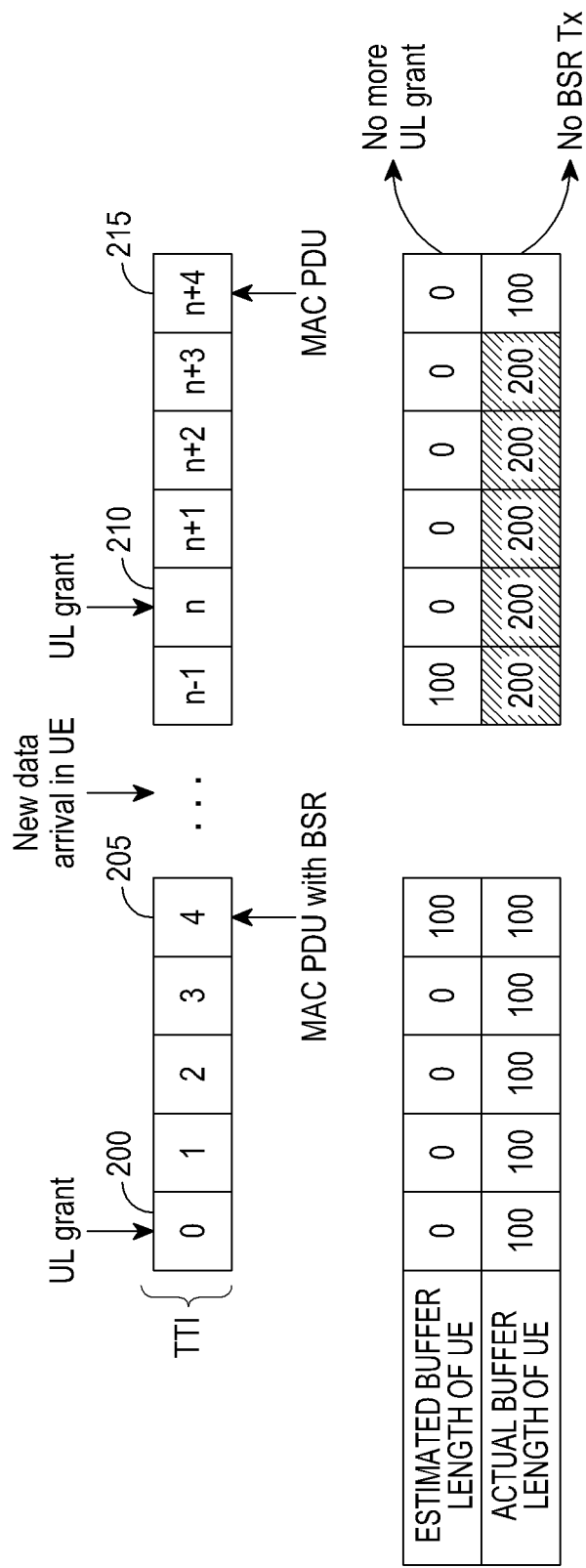
FIG. 2 illustrates a case in which a BSR stall phenomenon occurs according to the related art.

FIG. 2 illustrates an exemplary case in which a BSR stall phenomenon occurs according to the related art.

Referring to FIG. 2, like the case illustrated in FIG. 1, it is assumed that 100 bytes of data are buffered in a buffer of a UE in a TTI prior to a first TTI 200 (TTI 0) and the UE transmits an SR to a UL scheduler and thus receives a first UL grant indicating resources allocated for BSR transmission from the UL scheduler in TTI 0. When new 100 bytes of data are added to the buffer of the UE during the time period between a fifth TTI 205 (TTI 4) and an $(n+5)^{th}$ TTI 215 (TTI (n+4)), the actual buffer length of the UE is 200 bytes during the time period from an $n^{th}$ TTI (TTI (n−1)) to an $(n+4)^{th}$ TTI (TTI (n+3)) and 100 bytes in TTI (n+4).

Only if new data is generated with the buffer length being 0 bytes, the UE usually transmits a BSR to the UL scheduler. However, since the buffered data increases from 100 bytes to 200 bytes, the UE does not transmit a BSR to the UL scheduler. Consequently, the UL scheduler is not aware of the new data input to the buffer of the UE and thus estimates the buffer length of the UE to be 100 bytes, which does not reflect the actual buffer length of 200 bytes in TTI n−1. Accordingly, the UL scheduler transmits a second UL grant to the UE to allocate resources for transmission of the 100-byte data corresponding to the estimated buffer length of the UE in TTI n 210. Then the UL scheduler receives a 100-byte MAC PDU without a BSR from the UE in TTI (n+4) and estimates the buffer length of the UE to be '0'. Thus the UL scheduler does not transmit any more UL grants to the UE. As a result, although the UE has an actual buffer length of 100 bytes, it is placed in a BSR stall state where it cannot transmit a BSR.

In this context, methods and apparatuses for UL scheduling at a BS to minimize the BSR stall phenomenon according to exemplary embodiments of the present invention will be described below.

In accordance with an exemplary embodiment of the present invention, a BSR indicating the absence of buffered data at a UE is defined as a 'zero BSR'. A UL scheduler of a BS keeps a UE in a UL scheduling list that lists UEs to be scheduled for UL transmission until receiving a zero BSR from the UE. The UL scheduler may place the UE in three states depending on whether the UE scheduler has received a zero BSR from the UE. The three states are a 'non-zero BSR reception state', a 'zero BSR reception state', and a 'zero BSR reception and all Negative ACKnowledgments (NACKs)-for-retransmission data reception state'. The definition of each state will be described in more detail with reference to FIG. 3.

Figure 3:
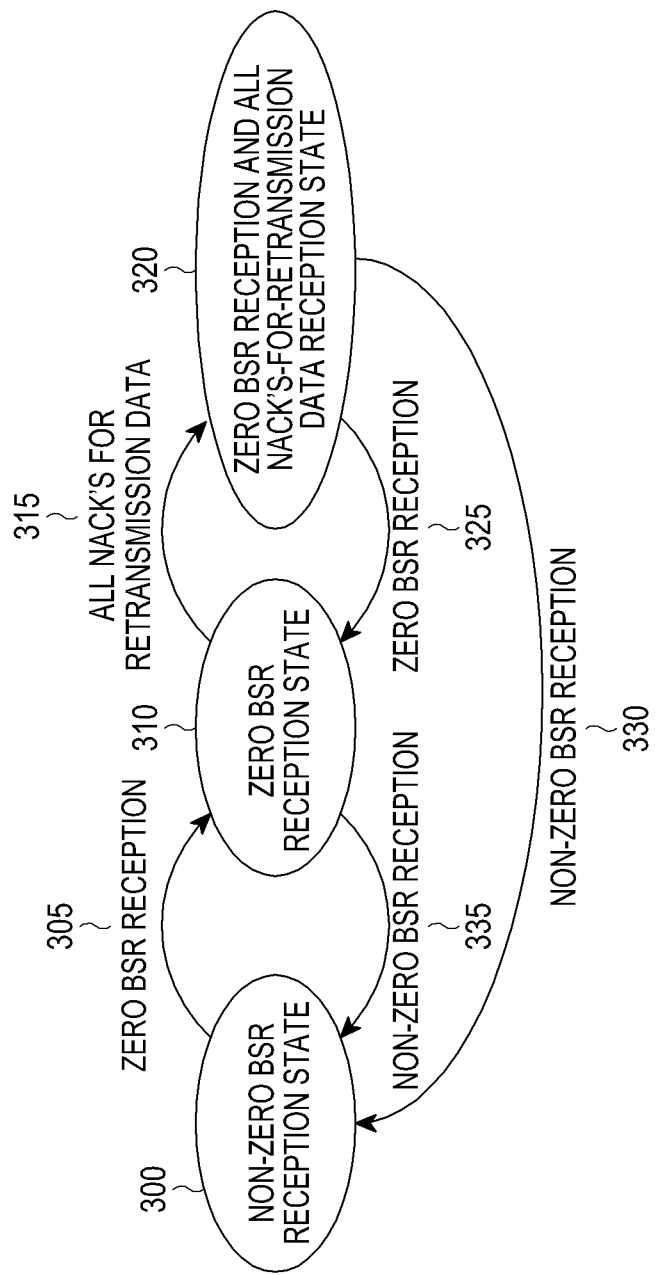
FIG. 3 is a diagram illustrating an operation for managing the state transitions of User Equipments (UEs) according to zero BSRs according to a first exemplary embodiment of the present invention.

FIG. 3 is a diagram illustrating an operation for managing the state transitions of UEs according to zero BSRs according to a first exemplary embodiment of the present invention.

Before describing FIG. 3, it is clarified that although an operation for managing state transitions of a first UE, which is one of a plurality of UEs managed by a BS, is described below, state transitions of the other UEs are managed in the same manner.

Referring to FIG. 3, the UL scheduler of the BS manages state transitions of the first UE. The UL scheduler of the BS also determines whether to include the first UE in a UL scheduling list depending on whether a BSR received from the first UE is a zero BSR or a non-zero BSR and whether data to be retransmitted (referred to as retransmission data) exists in a buffer of the first UE.

To be more specific, upon receipt of a non-zero BSR from the first UE, the UL scheduler sets the first UE in a non-zero BSR reception state 300. Even though the UL scheduler estimates the buffer length of the first UE to be '0', it manages the first UE in the non-zero BSR reception state 300 so long as it does not receive a zero BSR from the first UE. Then the UL scheduler includes UEs set in the non-zero BSR reception state 300 in a UL scheduling list.

Upon receipt of a zero BSR from the first UE in the non-zero BSR reception state in step 305, the UL scheduler transitions the first UE to a zero BSR reception state 310 and excludes the first UE from the UL scheduling list. For example, if the buffer of the first UE in the zero BSR reception state 310 does not have Hybrid Automatic Repeat reQuest (HARQ) retransmission data, which means that the buffer is empty, the UL scheduler excludes the first UE in the zero BSR reception state 310 from the UL scheduling list. Upon generation of new data in the empty buffer in the zero BSR reception state 310, the first UE triggers a regular BSR and transmits an SR to the UL scheduler. Thus, the first UE receives a UL grant for transmission of the regular BSR from the BS.

On the other hand, in the presence of HARQ retransmission data in the buffer of the first UE in the zero BSR reception state 310, the UL scheduler schedules the HARQ retransmission data. Upon receipt of NACK signals for all HARQ retransmissions of the retransmission data in step 315, the UL scheduler transitions the first UE to a zero BSR reception and all NACKs-for-retransmission data reception state 320, for retransmission of the data corresponding to the NACK signals that were generated. The UL scheduler includes the first UE in the UL scheduling list because although the UL scheduler has received the zero BSR from the first UE, there still remains data to be transmitted in the buffer of the first UE due to all NACK signals for the retransmissions.

In step 325, upon receipt of a zero BSR from the first UE in the zero BSR reception and all NACKs-for-retransmission data reception state 320, the UL scheduler returns the first UE to the zero BSR reception state 310.

Upon receipt of a non-zero BSR from the first UE in the zero BSR reception and all NACK-for-retransmission data reception state 320 in step 330, the UL scheduler transitions the first UE to the non-zero BSR reception state 300.

Upon receipt of a non-zero BSR from the first UE in the zero BSR reception state 310 in step 335, the UL scheduler transitions the first UE to the non-zero BSR reception state.

Figure 4:
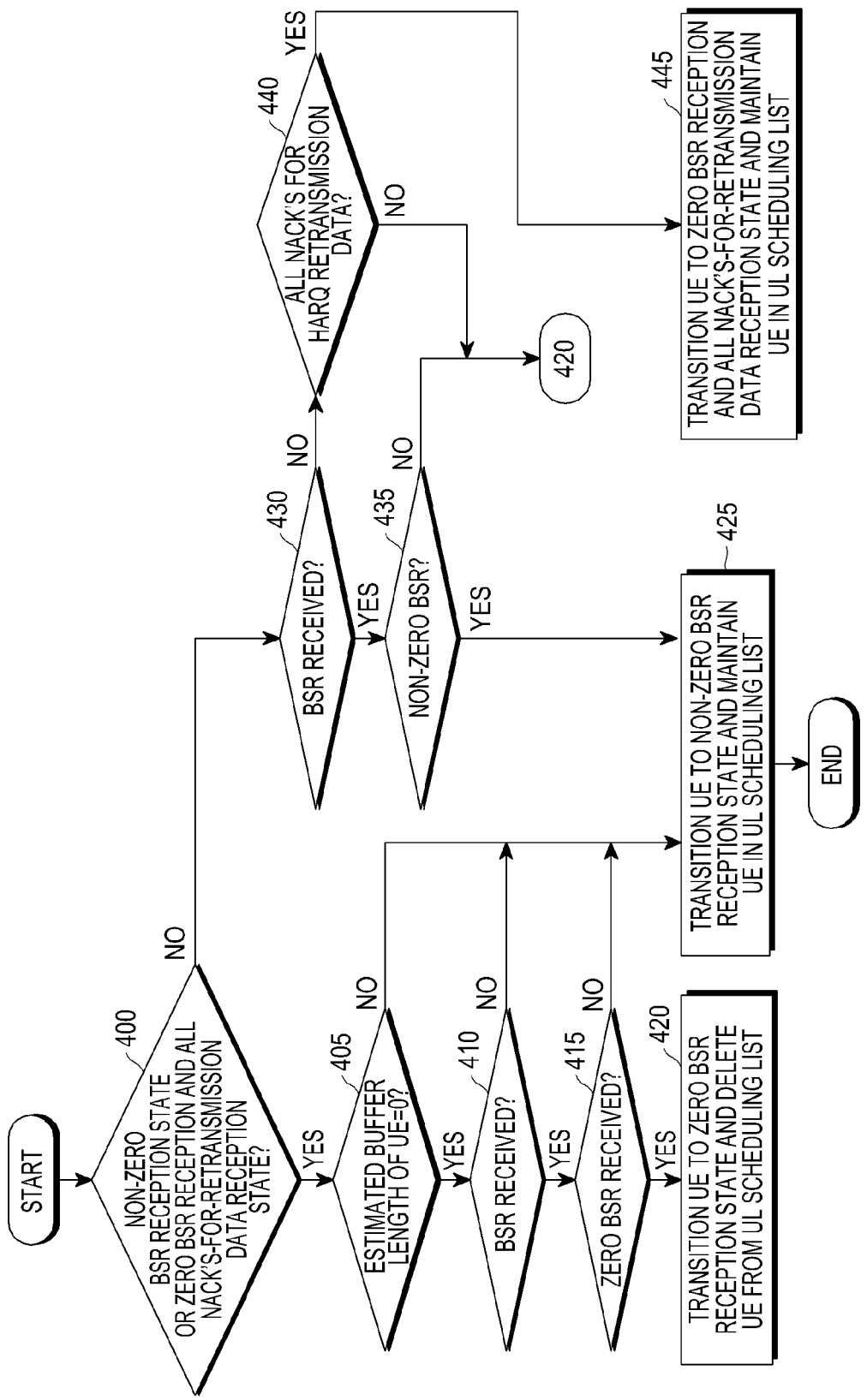
FIG. 4 is a flowchart illustrating an operation of an UpLink (UL) scheduler according to the first exemplary embodiment of the present invention.

FIG. 4 is a flowchart illustrating an operation of the UL scheduler according to the first exemplary embodiment of the present invention.

Before describing FIG. 4, it is clarified that although an operation for managing state transitions of a first UE, which is one of a plurality of UEs managed by a BS, is described below, state transitions of the other UEs are managed in the same manner.

Referring to FIG. 4, the UL scheduler determines whether the first UE is currently in the 'non-zero BSR reception state' or 'zero BSR reception and all NACKs-for-retransmission data reception state' in step 400. If the first UE is currently in the 'non-zero BSR reception state' or 'zero BSR reception and all NACKs-for-retransmission data reception state', the UL scheduler determines whether the buffer length of the first UE is estimated to be '0' in step 405. If the estimated buffer length of the first UE is not '0', the UL scheduler proceeds to step 425. On the other hand, if the estimated buffer length of the first UE is '0', the UL scheduler determines whether a BSR has been received from the first UE in step 410. If a BSR has not been received from the first UE, the UL scheduler proceeds to step 425.

Upon receipt of a BSR from the first UE, the UL scheduler determines whether the received BSR is a zero BSR or a non-zero BSR in step 415. In a case of a zero BSR, the UL scheduler transitions the first UE to the zero BSR reception state and excludes the first UE from the UL scheduling list in step 420. In a case of a non-zero BSR, the UL scheduler proceeds to step 425. In step 425, the UL scheduler transitions the first UE to the non-zero BSR reception state and includes the first UE in the UL scheduling list.

Meanwhile, if it is determined in step 400 that the current state of the first UE is neither the non-zero reception state nor the zero BSR reception and all NACKs-for-retransmission data reception state, the UL scheduler determines whether a BSR has been received from the first UE in step 430. If a BSR has not been received, the UL scheduler proceeds to step 440. Upon receipt of a BSR, the UL scheduler determines whether the received BSR is a zero BSR or a non-zero BSR in step 435. In a case of a non-zero BSR, the UL scheduler proceeds to step 425 and in case of a zero BSR, the UL scheduler proceeds to step 420.

In step 440, the UL scheduler determines whether NACK signals have been generated for all receptions of HARQ retransmission data from the first UE. If NACK signals have not been generated for all receptions of HARQ retransmission data from the first UE, the UL scheduler proceeds to step 420. Upon generation of NACK signals for all receptions of the HARQ retransmission data of the first UE, the UL scheduler transitions the first UE to the zero BSR reception and all NACKs-for-retransmission data reception state and includes the first UE in the UL scheduling list in step 445.

As described above, the UL scheduler includes a UE in the UL scheduling list until before receiving a zero BSR from the UE. The UL scheduler includes even a UE placed in the zero BSR reception state in the UL scheduling list, if the UE has retransmission data in its buffer, in accordance with an exemplary embodiment of the present invention.

However, even though the UL scheduler determines whether to include a UE in the UL scheduling list according to whether a zero BSR has been received from the UE and whether the UE has retransmission data, the BSR stall phenomenon may still occur. For example, in a scheduling scheme such as round-robin scheduling, the UL scheduler guarantees scheduling for a UE included in the UL scheduling list. In contrast, in a Quality of Service (QoS) scheduling scheme for determining whether to include a UE in a UL scheduling list, taking into account the buffer state of the UE, if the buffer length of the UE is '0' or a very small value, the UE may not be included in the UL scheduling list for a long time.

Therefore, virtual data is generated to prevent BSR stall and to prevent the UL scheduler from repeatedly generating a UL grant for BSR transmission of a UE in accordance with an exemplary embodiment of the present invention. More specifically, if a UE is included in the UL scheduling list in spite of the estimated buffer length of the UE being '0', the UL scheduler adds a predetermined virtual data length to the estimated buffer length of the UE and transmits a UL grant to the UE to allocate resources for BSR transmission. The UL scheduler generates virtual data for the UE and stores information indicating that a UL grant was transmitted to the UE in relation to the virtual data, to thereby prevent repeated transmission of a UL grant to the UE.

In this exemplary embodiment of the present invention, the non-zero BSR reception state is further divided into three sub-states. The three sub-states are determined based on the estimated buffer length of a UE in the non-zero BSR reception state. The three sub-states are a 'UL grant normal reception state', a 'UL grant reception waiting state', and a 'UL grant reception state'. The definition of each sub-state will be described in more detail with reference to FIG. 5.

Figure 5:
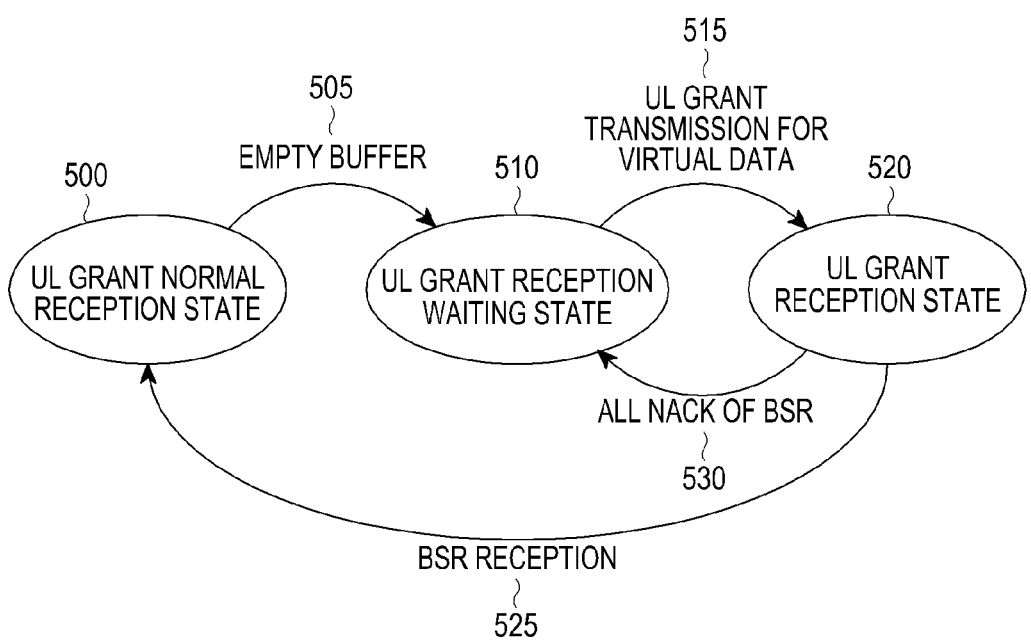
FIG. 5 illustrates an operation for managing the state transitions of UEs at a UL scheduler according to a second exemplary embodiment of the present invention.

FIG. 5 illustrates an operation for managing the state transitions of UEs at a UL scheduler according to a second exemplary embodiment of the present invention.

Before describing FIG. 5, it is clarified that although an operation for managing state transitions of a first UE, which is one of a plurality of UEs managed by a BS, is described below, state transitions of the other UEs are managed in the same manner.

Referring to FIG. 5, the UL scheduler estimates the buffer length of the first UE placed in the non-zero BSR reception state. If the estimated buffer length of the first UE is not '0', which implies that a UL grant will be transmitted normally to the first UE, the UL scheduler transitions the UE to a UL grant normal reception state 500. Then the UL scheduler receives a BSR from the first UE in the UL grant normal reception state 500. The UL scheduler allocates resources for data transmission corresponding to an estimated buffer length calculated from the BSR to the first UE, that is, the UL scheduler transmits a UL grant to the first UE.

In step 505, the UL scheduler estimates the buffer length of the first UE in the UL grant normal reception state 500. If the estimated buffer length of the first UE is 0, which implies that a UL grant for BSR transmission will not be transmitted to the first UE, the UL scheduler transitions the first UE to a UL grant reception waiting state 510. While the estimated buffer length of the first UE in the UL grant reception waiting state 510 is '0', the UL scheduler generates virtual data for the first UE in the UL grant reception waiting state 510 so that the first UE may transmit a BSR. Therefore, the estimated buffer length of the first UE includes the length of the virtual data.

In step 515, the UL scheduler transmits a UL grant to the first UE in the UL grant reception waiting state 510 in order to allocate resources for BSR transmission. When the first UE receives the UL grant in the UL grant reception waiting state 510, the UL scheduler transitions the first UE to a UL grant reception state 520. Before transitioning the first UE to the UL grant reception state 520, the UL scheduler re-sets the estimated buffer length of the first UE to '0', thereby preventing repeated transmissions of a UL grant to the first UE.

Then the UL scheduler transitions the first UE according to whether a BSR has been received from the first UE in the UL grant reception state 510. That is, upon successful receipt of a BSR from the first UE in the UL grant reception state 520, the UL scheduler transitions the first UE to the UL grant normal reception state in step 525. On the other hand, if a NACK signal is generated for a BSR received from the first UE in the UL grant reception state 520, in step 530 the UL scheduler transitions the first UE from the UL grant reception state 520 to the UL grant reception waiting state 510 in order to re-receive the BSR. Herein, the UL scheduler re-sets the estimated buffer length of the first UE.

Figure 6A:
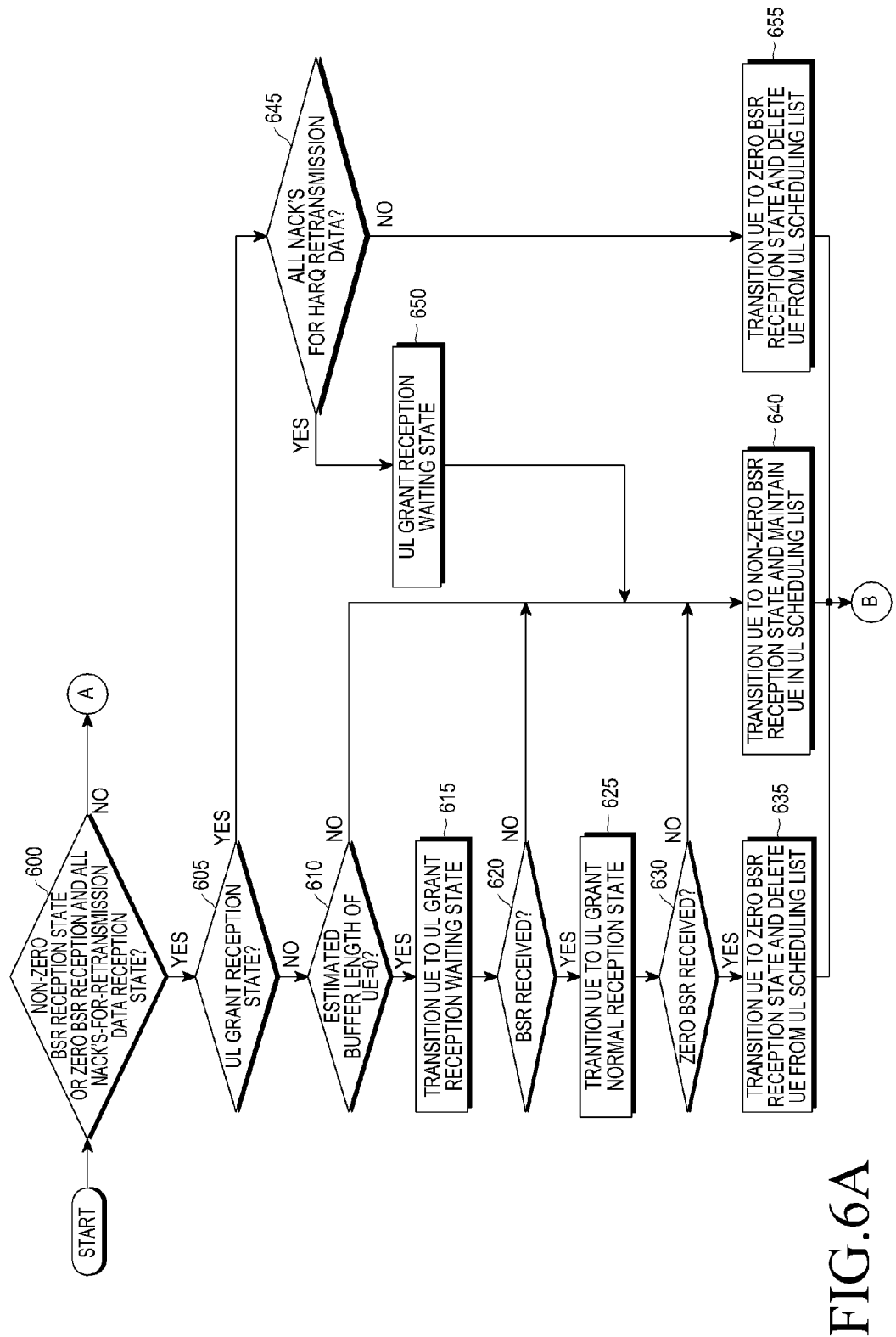
FIGS. 6A and 6B are flowcharts illustrating an operation of a UL scheduler according to the second exemplary embodiment of the present invention.
Figure 6B:
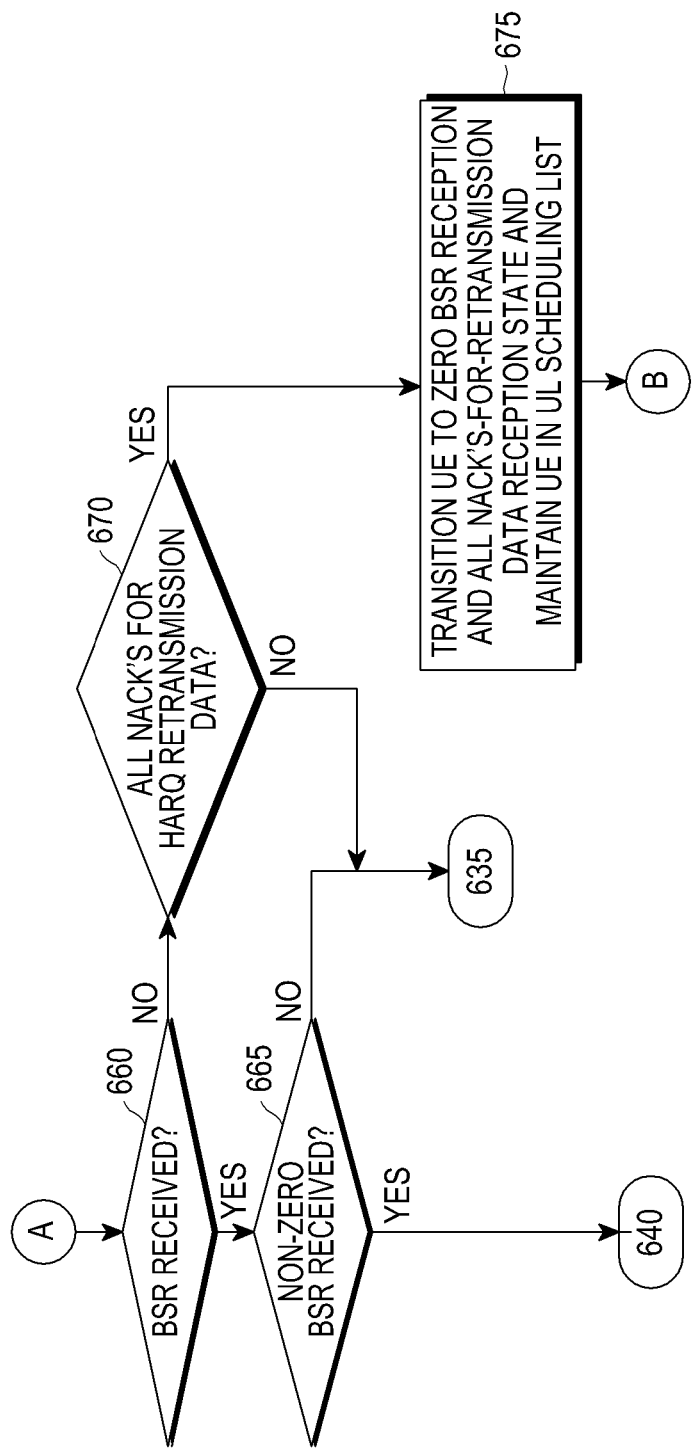

FIGS. 6A and 6B are flowcharts illustrating an operation of the UL scheduler according to the second exemplary embodiment of the present invention.

Before describing FIGS. 6A and 6B, it is clarified that although an operation for managing state transitions of a first UE, which is one of a plurality of UEs managed by a BS, is described below, state transitions of the other UEs are managed in the same manner.

Referring to FIGS. 6A and 6B, the UL scheduler determines whether the first UE is currently in the 'non-zero BSR reception state' or 'the zero BSR reception and all NACKs-for-retransmission data reception state' in step 600. If the first UE is neither in the 'non-zero BSR reception state' nor in 'the zero BSR reception and all NACKs-for-retransmission data reception state', the UL scheduler proceeds to step 660.

On the contrary, if the first UE is in the 'non-zero BSR reception state' or 'the zero BSR reception and all NACKs-for-retransmission data reception state', the UL scheduler determines whether the first UE is in the UL grant reception state in step 605. If the first UE is in the UL grant reception state, the UL scheduler proceeds to step 645. If the first UE is not in the UL grant reception state, the UL scheduler determines whether the estimated buffer length of the first UE is '0' in step 610. If the estimated buffer length of the first UE is not '0', the UL scheduler transitions the first UE to the non-zero BSR reception state and includes the first UE in the UL scheduling list in step 640.

Meanwhile, if the estimated buffer length of the first UE is '0', the UL scheduler transitions the first UE to the UL grant reception waiting state in step 615 and determines whether a BSR has been received from the first UE in step 620. If a BSR has not been received from the first UE, the UL scheduler proceeds to step 640. Upon receipt of a BSR from the first UE, the UL scheduler transitions the first UE to the UL grant normal reception state in step 625 and determines whether the received BSR is a zero BSR in step 630. If the BSR is a non-zero BSR, the UL scheduler proceeds to step 640. If the BSR is a zero BSR, the UL scheduler transitions the first UE to the zero BSR reception state and excludes the first UE from the UL scheduling list in step 635.

In the mean time, if it is determined in step 605 that the first UE is in the UL grant reception state, the UL scheduler determines whether NACK signals have been generated for all receptions of HARQ retransmission data transmitted by the first UE in step 645. Upon generation of NACK signals for all receptions of the HARQ retransmission data, the UL scheduler transitions the first UE to the UL grant reception waiting state in step 650 and proceeds to step 640. If NACK signals have not been generated for all receptions of the HARQ retransmission data, the UL scheduler transitions the first UE to the non-zero BSR reception state and excludes the first UE from the UL scheduling list in step 655.

If it is determined in step 600 that the first UE is neither in the 'zero BSR reception state' nor in the 'zero BSR reception and all NACKs-for-retransmission data reception state', the UL scheduler determines whether a BSR has been received from the first UE in step 660. Upon receipt of a BSR from the first UE, the UL scheduler determines whether the BSR is a non-zero BSR in step 665. If the BSR is a non-zero BSR, the UL scheduler proceeds to step 640. If the BSR is a zero BSR, the UL scheduler proceeds to step 635.

If it is determined in step 660 that a BSR has not been received from the first UE, the UL scheduler determines whether NACK signals have been generated for all receptions of HARQ retransmission data transmitted by the first UE in step 670. If NACK signals have not been generated for all receptions of HARQ retransmission data, the UL scheduler proceeds to step 635. Upon generation of NACK signals for all receptions of the HARQ retransmission data, the UL scheduler transitions the first UE to the 'zero BSR reception and all NACKs-for-retransmission data reception state' and keeps the first UE in the UL scheduling list in step 675 and proceeds to step 700, which is described below with reference to FIG. 7.

Figure 7:
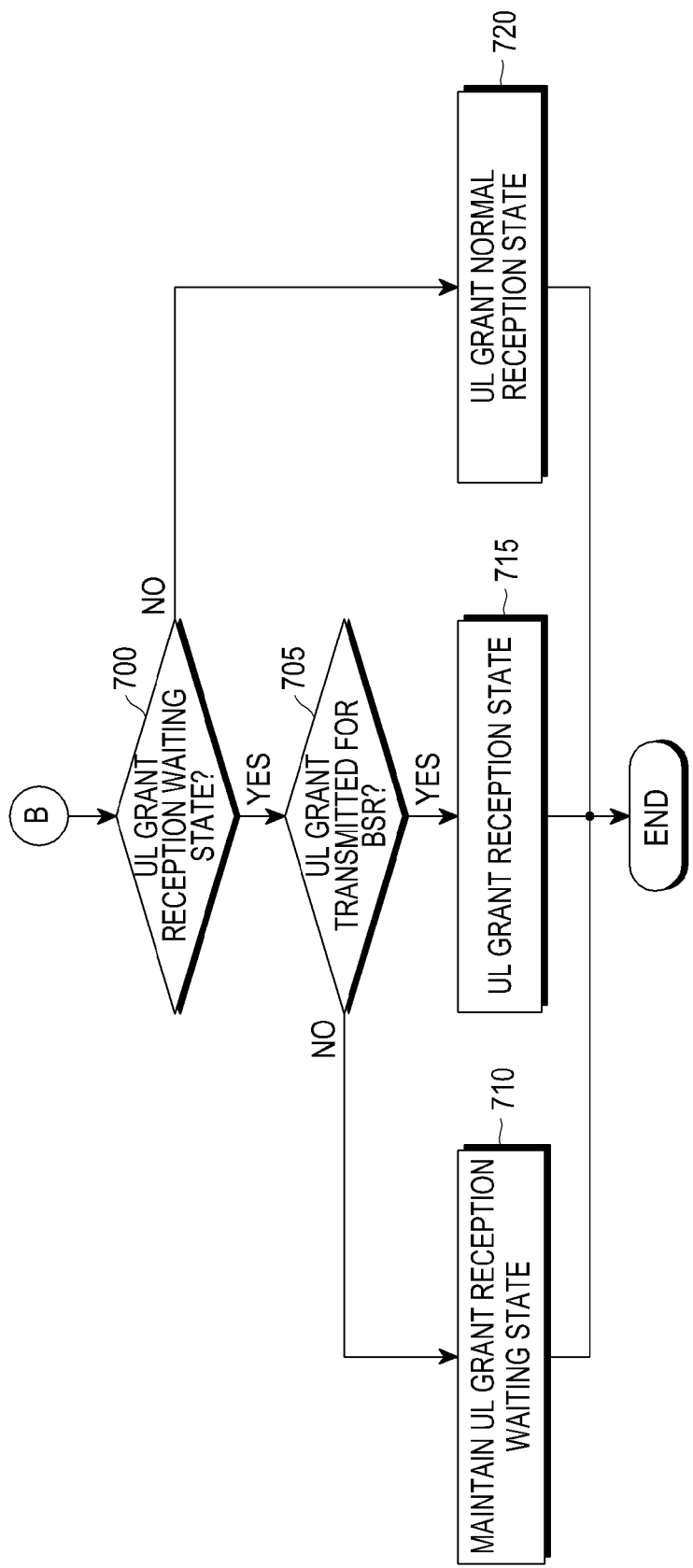
FIG. 7 is a flowchart illustrating an operation for managing UEs in a UL scheduling list at a UL scheduler according to the second exemplary embodiment of the present invention.

The UEs included in the UL scheduling list are managed as illustrated in FIG. 7 through the above-described management of the UL scheduling list of the UL scheduler.

FIG. 7 is a flowchart illustrating an operation for managing UEs in a UL scheduling list at a UL scheduler according to the second exemplary embodiment of the present invention.

Before describing FIG. 7, it is clarified that although an operation for managing state transitions of a first UE, which is one of a plurality of UEs managed by a BS, is described below, state transitions of the other UEs are managed in the same manner.

Referring to FIG. 7, the UL scheduler determines whether the first UE is currently in the UL grant reception waiting state in step 700. If the first UE is not currently in the UL grant reception waiting state, the UL scheduler transitions the first UE to the UL grant normal reception state in step 720. If the first UE is currently in the UL grant reception waiting state, the UL scheduler determines whether a UL grant has been transmitted to the first UE, for BSR transmission in step 705. If a UL grant has not been transmitted to the first UE, the UL scheduler keeps the first UE in the UL grant reception waiting state in step 710. If a UL grant has been transmitted to the first UE, the UL scheduler transitions the UE to the UL grant reception state to prevent repeated allocations of a UL grant to the UE in step 715.

In an exemplary implementation, the UL scheduler periodically allocates a UL grant to a UE that is in the non-zero BSR reception state and has not transmitted a BSR for a predetermined time, so that the UE can transmit a BSR. To periodically allocate a UL grant to the UE, the UL scheduler activates a timer no_BSR_timer for each of the UEs included in the UL scheduling list. The timer no_BSR_timer counts a time period during which a BSR has not been received from a UE. Then the UL scheduler sets an indication regarding BSR reception in every TTI. More specifically, upon receipt of a BSR in every TTI, the UL scheduler sets a BSR reception indication to '0' for the TTI and if a BSR has not been received in the TTI, the UL scheduler increases the BSR reception indication by '1'. Then, if the timer no_BSR_timer exceeds a threshold, the UL scheduler operates for the UE as if there were virtual data of a BSR size. The threshold of the timer no_BSR_timer may be set to a value related to a Packet Delay Budget (PDB) of logical channel groups of the UE. For instance, the threshold of the timer no_BSR_timer may be set to a half of the PDB.

Figure 8:
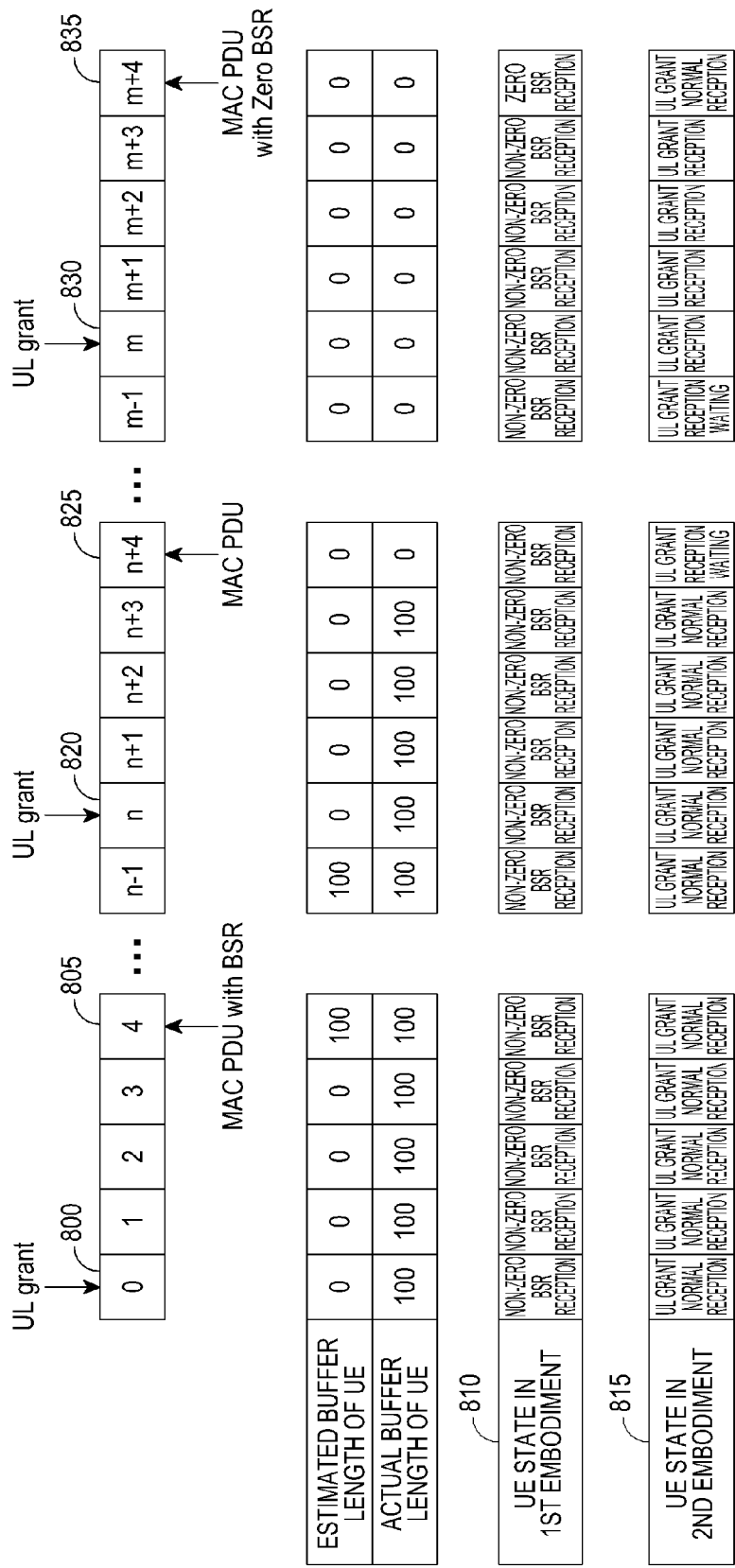
FIG. 8 illustrates an exemplary operation for allocating a UL grant for BSR transmission of a UE at a UE scheduler according to the first and second exemplary embodiments of the present invention.

FIG. 8 illustrates an operation for allocating a UL grant for BSR transmission of a UE at a UE scheduler according to the first and second exemplary embodiments of the present invention.

Before describing FIG. 8, it is clarified that although an operation for managing state transitions of a UE managed by a BS at a UL scheduler is described below, state transitions of the other UEs are managed in the same manner.

Referring to FIG. 8, it is assumed that a state 810 of a UE according to the first embodiment of the present invention is managed by a UL scheduler according to the first embodiment of the present invention and a state 815 of a UE according to the second embodiment of the present invention is managed by a UL scheduler according to the second embodiment of the present invention.

It is also assumed that 100 bytes of data are buffered in a buffer of the UE in a TTI previous to a first TTI 800 (TTI 0) and the UE transmits an SR to the UL scheduler and thus receives a first UL grant for allocating resources for BSR transmission from the UL scheduler in TTI 0.

In a fifth TTI 805 (TTI 4), the UE transmits a MAC PDU including a BSR according to the UL grant to the UL scheduler. Upon receipt of the BSR, the UL scheduler estimates the buffer length of the UE to be 100 bytes. In this case, the actual buffer length of the UE is equal to its estimate calculated by the UL scheduler. For convenience of description, a processing delay taken to estimate the buffer length after receiving the MAC PDU at the UL scheduler is assumed to be '0'. According to the first exemplary embodiment of the present invention, the UL scheduler transitions the UE to the non-zero BSR reception state because the UL scheduler received a BSR from the UE during the time period from TTI 0 to TTI 4. According to the second exemplary embodiment of the present invention, the UL scheduler transitions the UE to one of the sub-states of the non-zero BSR reception state, the UL grant normal reception state because the UL scheduler received a BSR from the UE during the time period from TTI 0 to TTI 4.

The UL scheduler then transmits a second UL grant for allocating resources for transmission of the 100-byte data to the UE in an $(n+1)^{th}$ TTI 820 (TTI n). The UE transmits a MAC PDU to the UL scheduler four TTIs later, that is, in an $(n+5)^{th}$ TTI 825 (TTI (n+4)) to the UL scheduler. Upon receipt of the MAC PDU in TTI (n+4), the UL scheduler estimates the buffer length of the UE to be 0 bytes. Because a zero BSR has not been received from the UE in TTI (n+4), the UL scheduler keeps the UE in the non-zero BSR reception state until an $(m+5)^{th}$ TTI (TTI (m+4)) in the first exemplary embodiment of the present invention. In the second exemplary embodiment of the present invention, because the estimated buffer length is 0 bytes in TTI (n+4), the UL scheduler transitions the UE from the UL grant normal reception state to the UL grant reception waiting state.

If the UL scheduler determines that a BSR has not been received from the UE for a predetermined time in an $(m+1)^{th}$ TTI 830 (TTI m), the UL scheduler transmits a periodical UL grant to the UE, for BSR transmission. In this case, while the scheduler keeps the UE in the non-zero BSR reception state according to the first embodiment of the present invention, it transitions the UE that has received the UL grant to the UL grant reception state according to the second exemplary embodiment of the present invention.

Then the UE transmits a MAC PDU including a zero BSR indicating a current buffer length being '0' to the UL scheduler based on the UL grant received in TTI m, in TTI (m+4) 835. In this case, since the UL scheduler was not aware of the estimated buffer length of the UE being '0' until before TTI m, that is, until an $(m+4)^{th}$ TTI (TTI (m+3)), it keeps the UE in the non-zero BSR reception state until TTI (m+3) and then transitions the UE to the zero BSR reception state in TTI (m+4) in the first exemplary embodiment of the present invention.

Meanwhile, since the UL scheduler received the zero BSR from the UE in TTI (m+4) 835, it determines that the estimated buffer length of the UE is '0' and returns the UE to the UL grant normal reception state in the second exemplary embodiment of the present invention.

Figure 9:
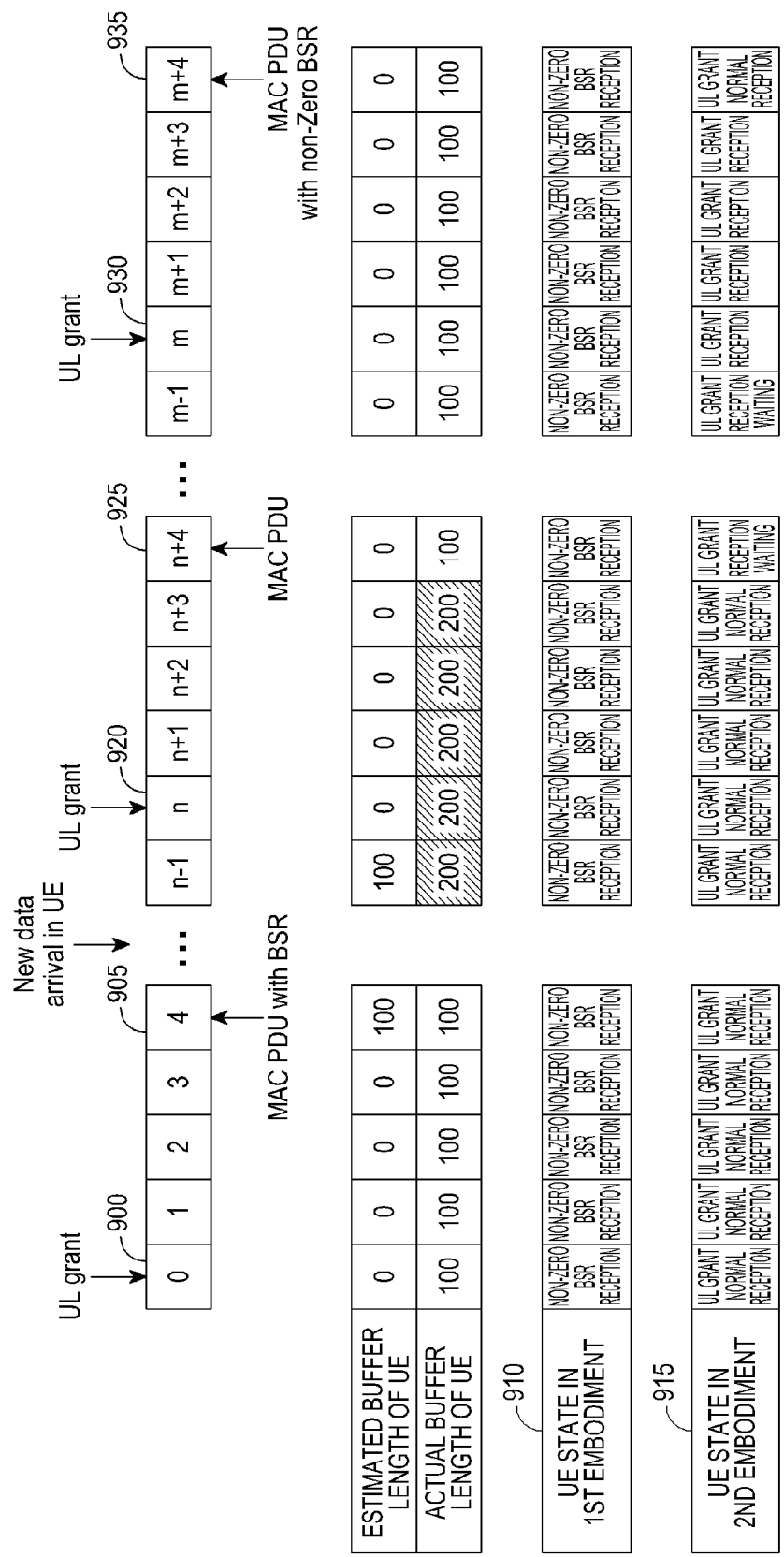
FIG. 9 illustrates an operation for allocating a UL grant for BSR transmission of a UE at a UE scheduler according to the first and second exemplary embodiments of the present invention.

FIG. 9 illustrates an operation for allocating a UL grant for BSR transmission of a UE at a UE scheduler according to the first and second exemplary embodiments of the present invention.

Before describing FIG. 9, it is clarified that although an operation for managing state transitions of a UE managed by a BS at a UL scheduler is described below, state transitions of the other UEs are managed in the same manner.

Referring to FIG. 9, it is assumed that a state 910 of a UE according to the first exemplary embodiment of the present invention is managed by a UL scheduler according to the first exemplary embodiment of the present invention and a state 915 of a UE according to the second exemplary embodiment of the present invention is managed by a UL scheduler according to the second exemplary embodiment of the present invention.

Like the case illustrated in FIG. 8, it is also assumed that 100 bytes of data are buffered in a buffer of the UE during a TTI previous to a first TTI 900 (TTI j) and the UE transmits an SR to the UL scheduler and thus receives a first UL grant for allocating resources for BSR transmission from the UL scheduler in TTI 0. It is also assumed that new 100-bytes data is added to the buffer of the UE during the time period between a fifth TTI 905 (TTI 4) and an $(n+5)^{th}$ TTI 925 (TTI (n+4)). In this case, the actual buffer length of the UE is 200 bytes at the moment the new data is added, that is, in an nth TTI (TTI (n-1)) to an $(n+4)^{th}$ TTI (TTI (n+3)) and 100 bytes in TTI (n+4). According to the first exemplary embodiment of the present invention, the UL scheduler transitions the UE to the non-zero BSR reception state because the UL scheduler received a BSR from the UE in TTI 0 to TTI 4. According to the second exemplary embodiment of the present invention, the UL scheduler transitions the UE to the UL grant normal reception state being a sub-state of the non-zero BSR reception state because the UL scheduler received a BSR from the UE in TTI 0 to TTI 4.

Then, the UL scheduler transmits to the UE a second UL grant for transmission of the 100-byte data from the UE in an $(n+1)^{th}$ TTI 920 (TTI n). The UE transmits a MAC PDU carrying the 100-byte data to the UL scheduler four TTIs later, that is, in an $(n+5)^{th}$ TTI 925 (TTI (n+4)) to the UL scheduler. Upon receipt of the MAC PDU in TTI (n+4), the UL scheduler estimates the buffer length of the UE to be 0 bytes. Because the UL scheduler is not aware of the actual buffer length of the UE but has not received a zero BSR from the UE, the UL scheduler keeps the UE in the non-zero BSR reception state. In the second exemplary embodiment of the present invention, because the UL scheduler estimates the buffer length of the UE is 0 bytes in TTI (n+4), the UL scheduler transitions the UE from the UL grant normal reception state to the UL grant reception waiting state.

If the UL scheduler determines that a BSR has not been received from the UE for a predetermined time in an $(m+1)^{th}$ TTI 930 (TTI m), the UL scheduler transmits a periodical UL grant to the UE, for BSR transmission. In this case, while the scheduler keeps the UE in the non-zero BSR reception state according to the first exemplary embodiment of the present invention, it transitions the UE that has received the UL grant to the UL grant reception state according to the second exemplary embodiment of the present invention.

Then the UE transmits a MAC PDU including a non-zero BSR indicating a current buffer length being '100' bytes to the UL scheduler based on the UL grant received in TTI m, in TTI (m+4) 935. In this case, since the UL scheduler has not received a zero BSR yet, it keeps the UE in the non-zero BSR reception state until TTI (m+4) 935 in an exemplary embodiment of the present invention.

Meanwhile, since the UL scheduler received the non-zero BSR from the UE in TTI (m+4) 935, it determines that the estimated buffer length of the UE is not '0' and returns the UE to the UL grant normal reception state in the second exemplary embodiment of the present invention.

Figure 10:
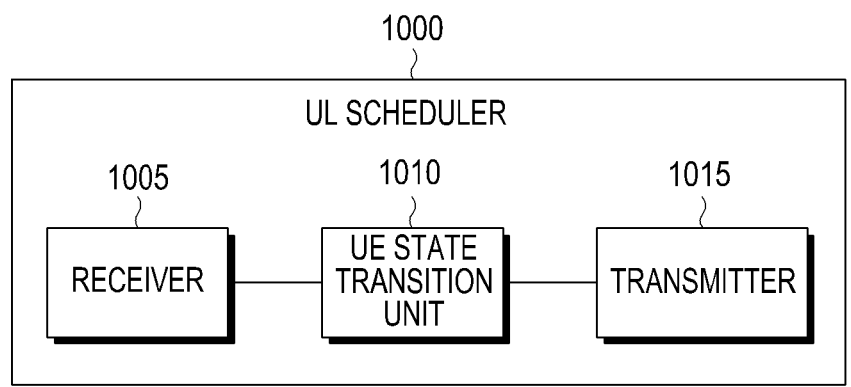
FIG. 10 is a block diagram of a UL scheduler according to an exemplary embodiment of the present invention.

FIG. 10 is a block diagram of a UL scheduler according to an exemplary embodiment of the present invention.

Referring to FIG. 10, a UL scheduler 1000 includes a receiver 1005, a UE state transition unit 1010, and a transmitter 1015.

The receiver 1005 receives a BSR from each UE and provides the BSR to the UE state transition unit 1010. The UE state transition unit 1010 determines whether the received BSRs are zero BSRs. For a UE that has transmitted a zero BSR, the receiver 1005 transitions the UE to the zero BSR reception state according to the first exemplary embodiment of the present invention. For a UE that has transmitted a non-zero BSR, the UE state transition unit 1010 transitions the UE to the non-zero BSR reception state according to the first exemplary embodiment of the present invention. In the presence of HARQ retransmission data at the UE in the zero BSR reception state, the UE state transition unit 1010 determines whether the HARQ retransmission data has been received. Upon generation of NACK signals for all retransmissions of the HARQ retransmission data, the UE state transition unit 1010 transitions the UE to the 'zero BSR reception and all NACKs-for-retransmission data reception state' and keeps the UE in a UL scheduling list according to the first exemplary embodiment of the present invention.

Meanwhile, in the second exemplary embodiment of the present invention, the UE state transition unit 1010 transitions the UE to the UL grant normal reception state being a sub-state of the non-zero BSR reception state. Then if a BSR has not been received from the UE for a predetermined time, the UE state transition unit 1010 adds the length of virtual data to the buffer length of the UE and transitions the UE to the UL grant reception waiting state representing a state with the length of virtual data included in the buffer length. Then the UE state transition unit 1010 transmits a UL grant for BSR transmission to the UE according to the virtual data. In this case, the UE state transition unit 1010 transitions the UE to the UL grant reception state.

Upon successful receipt of a BSR from the UE in the UL grant reception state, the UE state transition unit 1010 transitions the UE to the UL grant normal reception state. If a BSR has not been received successfully from the UE, the UE state transition unit 1010 transitions the UE to the UL grant reception waiting state.

As is apparent from the above description of exemplary embodiments of the present invention, UE states are defined for a UE depending on whether a BSR has been received from the UE and uplink scheduling is performed for the UE based on the state of the UE. Therefore, BSR stall is reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for uplink scheduling in a communication system, the method comprising:
   determining whether a User Equipment (UE) is included in an uplink scheduling list;

estimating a buffer length of the UE, if the UE is included in the uplink scheduling list;
determining whether a Buffer State Report (BSR) indicating the buffer length of the UE has been received from the UE, if the estimated buffer length is 0; and
transitioning a state of the UE to a non-zero BSR reception state and maintaining the UE in the uplink scheduling list, if the BSR has not been received from the UE,
wherein the non-zero BSR reception state is a state in which a zero BSR indicating the buffer length of the UE is 0 has not been received from the UE.

2. The method of claim 1, wherein the determining of whether the UE is included in the uplink scheduling list comprises:
determining whether the state of the UE is in the non-zero BSR reception state or in a state of zero BSR reception and all failures-for-receptions of Hybrid Automatic Repeat reQuest (HARQ) retransmission data buffered in a buffer of the UE,
wherein the zero BSR reception state is a state in which a zero BSR has been received from the UE.

3. The method of claim 1, further comprising:
determining, upon receipt of a BSR, whether the BSR is a zero BSR;
transitioning the state of the UE to a zero BSR reception state and deleting the UE from the uplink scheduling list, if the BSR is a zero BSR; and
transitioning the state of the UE to the non-zero BSR reception state and maintaining the UE in the uplink scheduling list, if the BSR is not a zero BSR.

4. The method of claim 1, further comprising:
determining whether a BSR has been received from the UE, if the UE is not included in the uplink scheduling list;
determining, upon receipt of a BSR, whether the BSR is a zero BSR; and
transitioning the state of the UE to the non-zero BSR reception state and including the UE in the uplink scheduling list, if the BSR is not a zero BSR.

5. The method of claim 4, further comprising:
determining whether all receptions of HARQ retransmission data buffered in a buffer of the UE have failed, if a BSR has not been received from the UE; and
including the UE in the UL scheduling list, if all the receptions of the HARQ retransmission data have failed.

6. The method of claim 1, further comprising:
transitioning the state of the UE to the non-zero BSR reception state and maintaining the UE in the uplink scheduling list, if the estimated buffer length is not 0.

7. The method of claim 1, further comprising:
determining whether the UE has received an uplink grant that allocates resources for transmission of the BSR, if the UE is included in the uplink scheduling list;
estimating the buffer length of the UE, if the UE has not received the uplink grant;
transitioning the state of the UE to an uplink grant reception waiting state and determining whether a BSR has been received from the UE, if the estimated buffer length is 0; and
transitioning the state of the UE to the non-zero BSR reception state and maintaining the UE in the uplink scheduling list, if a BSR has not been received from the UE.

8. The method of claim 6, further comprising:
transitioning the state of the UE to an uplink grant normal reception state indicating normal reception of the uplink grant at the UE and determining whether the BSR is a zero BSR, if the BSR has been received from the UE; and
transitioning the state of the UE to a zero BSR reception state and deleting the UE from the uplink scheduling list, if the BSR is a zero BSR.

9. The method of claim 8, further comprising:
transitioning the state of the UE to the non-zero BSR reception state and maintaining the UE in the uplink scheduling list, if the estimated buffer length is not 0.

10. An apparatus for uplink scheduling in a communication system, the apparatus comprising:
a state transition unit including a memory and a processor, the memory storing an uplink scheduling list, the processor configured to determine whether a User Equipment (UE) is included in the uplink scheduling list stored in the memory of the state transition unit, the processor further configured to estimate a buffer length of the UE, if the UE is included in the uplink scheduling list stored in the memory of the state transition unit, the processor further configured to determine whether a receiver has received a Buffer State Report (BSR) indicating the buffer length of the UE from the UE, if the estimated buffer length is 0, and the processor further configured to transition a state of the UE to a non-zero BSR reception state and maintaining the UE in the uplink scheduling list stored in the memory of the state transition unit, if the receiver has not received the BSR from the UE,
wherein the non-zero BSR reception state is a state in which a zero BSR indicating the buffer length of the UE is 0 has not been received from the UE.

11. The apparatus of claim 10, wherein the state transition unit determines that the UE is included in the uplink scheduling list, if the state of the UE is in the non-zero BSR reception state or in a state of zero BSR reception and all failures-for-receptions of Hybrid Automatic Repeat reQuest (HARQ) retransmission data buffered in a buffer of the UE,
wherein the zero BSR reception state is a state in which a zero BSR has been received from the UE.

12. The apparatus of claim 10, wherein, if the receiver has received a BSR, the state transition unit determines whether the BSR is a zero BSR, and transitions the state of the UE to a zero BSR reception state and deletes the UE from the uplink scheduling list, if the BSR is a zero BSR, and the state transition unit transitions the state of the UE to the non-zero BSR reception state and maintains the UE in the uplink scheduling list, if the BSR is not a zero BSR.

13. The apparatus of claim 10, wherein the state transition unit determines whether a BSR has been received from the UE, if the UE is not included in the uplink scheduling list, determines, upon receipt of a BSR, whether the BSR is a zero BSR, and transitions the state of the UE to the non-zero BSR reception state and includes the UE in the uplink scheduling list, if the BSR is not a zero BSR.

14. The apparatus of claim 13, wherein the state transition unit determines whether all receptions of HARQ retransmission data buffered in a buffer of the UE have failed, if a BSR has not been received from the UE, and includes the UE in the UL scheduling list, if all the receptions of the HARQ retransmission data have failed.

15. The apparatus of claim 10, wherein the state transition unit transitions the state of the UE to the non-zero BSR reception state and maintains the UE in the uplink scheduling list, if the estimated buffer length is not 0.

16. The apparatus of claim 10, wherein if the UE is included in the uplink scheduling list, the state transition unit determines whether the UE has received an uplink grant that allocates resources for transmission of the BSR, estimates the buffer length of the UE, if the UE has not received the uplink grant, transitions the state of the UE to an uplink grant reception waiting state and determines whether a BSR has been received from the UE, if the estimated buffer length is 0, and transitions the state of the UE to the non-zero BSR reception state and maintains the UE in the uplink scheduling list, if a BSR has not been received from the UE.

17. The apparatus of claim 14, wherein the state transition unit transitions the state of the UE to an uplink grant normal reception state indicating normal reception of the uplink grant at the UE and determines whether the BSR is a zero BSR, if the BSR has been received from the UE, and transitions the state of the UE to a zero BSR reception state and deletes the UE from the uplink scheduling list, if the BSR is a zero BSR.

18. The apparatus of claim 17, wherein the state transition unit transitions the state of the UE to the non-zero BSR reception state and maintains the UE in the uplink scheduling list, the estimated buffer length is not 0.

* * * * *